(12) United States Patent
Eckstein et al.

(10) Patent No.: US 8,142,554 B2
(45) Date of Patent: *Mar. 27, 2012

(54) METHOD FOR CLEANING THE FILTERS OF A VACUUM CLEANER AND VACUUM CLEANER FOR CARRYING OUT THE METHOD

(75) Inventors: Daniel Eckstein, Winnenden-Baach (DE); Thorsten Langen, Stuttgart (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 223 days.

This patent is subject to a terminal disclaimer.

(21) Appl. No.: 12/322,071

(22) Filed: Jan. 27, 2009

(65) Prior Publication Data

US 2009/0205491 A1     Aug. 20, 2009

Related U.S. Application Data

(63) Continuation of application No. PCT/EP2006/007544, filed on Jul. 29, 2006.

(51) Int. Cl.
*B01D 46/04* (2006.01)

(52) U.S. Cl. ............... 95/280; 55/283; 55/288; 55/302; 55/DIG. 3; 15/352

(58) Field of Classification Search ............ 55/302, 55/312, 313, 429, DIG. 3; 15/320, 353, 321, 15/347; 210/97, 109, 110, 130, 433.1, 443, 210/445; 96/399, 400
See application file for complete search history.

(56) References Cited

U.S. PATENT DOCUMENTS

| | | | |
|---|---|---|---|
| 2,591,567 A | 4/1952 | Lofgren et al. | |
| 3,325,979 A | 6/1967 | Smith | |
| 3,363,764 A | 1/1968 | Whitaker | |
| 3,396,516 A | 8/1968 | Ballard | |
| 3,431,709 A | 3/1969 | Kawanami | |
| 3,498,030 A | 3/1970 | Wilki | |
| 3,509,394 A | 4/1970 | Heidtmann | |
| 3,536,094 A | 10/1970 | Manley, Jr. | |
| 3,731,465 A | 5/1973 | Ohira et al. | |
| 3,748,836 A * | 7/1973 | Bachle ....................... | 55/302 |
| 3,792,569 A | 2/1974 | Carlson et al. | |

(Continued)

FOREIGN PATENT DOCUMENTS

DE         210 658         6/1909

(Continued)

*Primary Examiner* — Duane Smith
*Assistant Examiner* — Minh-Chau Pham
(74) *Attorney, Agent, or Firm* — Lipsitz & McAllister, LLC

(57) ABSTRACT

The invention relates to a method for cleaning filters of a vacuum cleaner having a dirt collecting container, which has a suction inlet and is in flow connection with at least one suction unit via at least one filter and at least one suction extraction line, and at least one external air inlet which opens into the suction extraction line downstream of the filter and can be closed by means of a closing valve. The closing valve has a movable valve body acted upon by a closing spring with a closing force and, in the closed position, additionally by a magnetic holder with a magnetic holding force. In order to clean the filter, at least one closing valve is opened and the side of the filter oriented away from the dirt collecting container is impinged upon by external air. A vacuum cleaner for carrying out the method is also provided.

22 Claims, 3 Drawing Sheets

U.S. PATENT DOCUMENTS

| | | |
|---|---|---|
| 3,868,237 A | 2/1975 | Berz |
| 3,945,390 A | 3/1976 | Huber |
| 3,951,623 A | 4/1976 | Furstenberg |
| 3,994,067 A | 11/1976 | Hazzard et al. |
| 4,033,732 A | 7/1977 | Axelsson et al. |
| 4,124,915 A | 11/1978 | Schlicher |
| 4,124,916 A | 11/1978 | Fromknecht |
| 4,171,208 A | 10/1979 | Lowder |
| 4,277,265 A | 7/1981 | Leinfelt |
| 4,329,161 A | 5/1982 | Osborn |
| RE31,417 E | 10/1983 | Huber |
| 4,482,129 A | 11/1984 | Baker et al. |
| 4,581,135 A | 4/1986 | Gerulis |
| 4,719,662 A | 1/1988 | Horak et al. |
| 4,733,326 A | 3/1988 | Harsch et al. |
| 4,921,510 A | 5/1990 | Plooy |
| 5,002,594 A | 3/1991 | Merritt |
| 5,178,652 A | 1/1993 | Hüttlin |
| 5,217,509 A | 6/1993 | Jansen |
| 5,246,205 A | 9/1993 | Gillingham et al. |
| 5,322,534 A | 6/1994 | Kaiser |
| 5,368,060 A | 11/1994 | Worrall et al. |
| 5,369,839 A | 12/1994 | Wörwag |
| 5,511,583 A | 4/1996 | Bassett |
| 5,882,180 A | 3/1999 | Kawaguchi et al. |
| 5,951,746 A | 9/1999 | Treitz et al. |
| 5,975,062 A | 11/1999 | Bonse et al. |
| 6,406,505 B1 | 6/2002 | Oh et al. |
| 6,440,191 B1 * | 8/2002 | Berfield et al. ............ 55/485 |
| 6,458,178 B1 | 10/2002 | Dietz et al. |
| 6,517,325 B2 | 2/2003 | Tsuru et al. |
| 6,640,385 B2 | 11/2003 | Oh et al. |
| 6,782,583 B2 | 8/2004 | Oh |
| 6,936,161 B2 * | 8/2005 | Wright et al. ............ 210/97 |
| 7,082,640 B2 | 8/2006 | McCutchen |
| 7,340,797 B2 | 3/2008 | Theiss, Jr. et al. |
| 7,647,672 B2 | 1/2010 | Nam et al. |
| 7,947,099 B2 | 5/2011 | Valentini |
| 8,015,660 B2 | 9/2011 | Bruntner |
| 2002/0066262 A1 | 6/2002 | Oh |
| 2002/0088078 A1 | 7/2002 | Oh et al. |
| 2002/0124729 A1 | 9/2002 | Dudley |
| 2003/0041729 A1 | 3/2003 | Finigan |
| 2003/0167590 A1 | 9/2003 | Oh |
| 2005/0011036 A1 | 1/2005 | McCutchen |
| 2005/0251953 A1 * | 11/2005 | Hackwell et al. ............ 15/387 |
| 2005/0254270 A1 | 11/2005 | Melchert et al. |
| 2008/0086835 A1 * | 4/2008 | Stewen et al. ............ 15/347 |
| 2008/0092498 A1 * | 4/2008 | Stewen et al. ............ 55/283 |
| 2009/0000485 A1 | 1/2009 | Valentini |
| 2009/0027823 A1 | 1/2009 | Follic et al. |
| 2009/0106933 A1 | 4/2009 | Bruntner |
| 2009/0205158 A1 * | 8/2009 | Eckstein et al. ............ 15/347 |
| 2009/0205159 A1 * | 8/2009 | Stewen et al. ............ 15/347 |
| 2009/0205499 A1 * | 8/2009 | Eckstein et al. ............ 95/279 |

FOREIGN PATENT DOCUMENTS

| | | |
|---|---|---|
| DE | 276953 | 7/1914 |
| DE | 338942 | 7/1921 |
| DE | 1 844 732 | 1/1962 |
| DE | 1 245 550 | 7/1967 |
| DE | 1 407 945 | 11/1968 |
| DE | 1 800 480 | 6/1970 |
| DE | 2 102 231 | 7/1971 |
| DE | 2 106 058 | 9/1971 |
| DE | 2 416 071 | 10/1974 |
| DE | 91 04 127 | 7/1991 |
| DE | 197 01 983 | 6/1998 |
| DE | 41 38 223 | 2/1999 |
| DE | 298 23 411 | 5/1999 |
| DE | 199 49 095 | 4/2001 |
| DE | 200 10 608 | 12/2001 |
| DE | 100 56 935 | 2/2002 |
| DE | 101 40 351 | 6/2002 |
| DE | 101 01 219 | 7/2002 |
| DE | 101 50 257 | 7/2002 |
| DE | 102 40 618 | 9/2003 |
| DE | 695 30 326 | 5/2004 |
| DE | 20 2004 012 911 | 10/2004 |
| DE | 10 2005 029 606 | 1/2006 |
| DE | 10 2004 056 076 | 5/2006 |
| DE | 10 2005 017 568 | 10/2006 |
| DE | 10 2005 017 702 | 12/2006 |
| DE | 10 2005 035 884 | 2/2007 |
| DE | 20 2007 015 242 | 12/2007 |
| EP | 0 197 036 | 10/1986 |
| EP | 0 289 987 | 11/1988 |
| EP | 0 873 075 | 10/1998 |
| EP | 0 955 003 | 11/1999 |
| EP | 1 166 705 | 1/2002 |
| EP | 1 340 446 | 9/2003 |
| EP | 1 656 872 | 5/2006 |
| EP | 1 743 562 | 1/2007 |
| EP | 1 913 857 | 4/2008 |
| EP | 1 997 415 | 12/2008 |
| GB | 956764 | 4/1964 |
| GB | 2 337 922 | 12/1999 |
| JP | 08038401 | 2/1996 |
| JP | 2002028107 | 1/2002 |
| JP | 2006181228 | 7/2006 |
| RU | 644513 | 1/1979 |
| WO | 85/02528 | 6/1985 |
| WO | 95/10972 | 4/1995 |
| WO | 95/27431 | 10/1995 |
| WO | 97/19630 | 6/1997 |
| WO | 01/74493 | 10/2001 |
| WO | 2004/100752 | 11/2004 |
| WO | 2005/006934 | 1/2005 |
| WO | 2006/108459 | 10/2006 |
| WO | 2008/014794 | 2/2008 |
| WO | 2008/014795 | 2/2008 |
| WO | 2008/014796 | 2/2008 |
| WO | 2008/014798 | 2/2008 |

* cited by examiner

METHOD FOR CLEANING THE FILTERS OF A VACUUM CLEANER AND VACUUM CLEANER FOR CARRYING OUT THE METHOD

This application is a continuation of international application number PCT/EP2006/007544 filed on Jul. 29, 2006.

The present disclosure relates to the subject matter disclosed in international application number PCT/EP2006/007544 of Jul. 29, 2006, which is incorporated herein by reference in its entirety and for all purposes.

BACKGROUND OF THE INVENTION

The invention relates to a method for cleaning the filters of a vacuum cleaner comprising a dirt collecting container, which has a suction inlet and is in flow connection with at least one suction unit via at least one filter and at least one suction extraction line, and comprising at least one external air inlet which opens into the suction extraction line downstream of the at least one filter and is adapted to be closed by means of at least one closing valve, wherein the at least one closing valve has a valve body which is movable back and forth between a closed position, in which it lies against a valve seat, and an open position, in which it is at a distance from the valve seat, wherein it is acted upon by a closing spring with a closing force and, in the closed position, additionally by a magnetic holder with a magnetic holding force, wherein, in order to clean the at least one filter, at least one closing valve is opened and the side of the at least one filter that is oriented away from the dirt collecting container is impinged upon by external air.

The invention also relates to a vacuum cleaner for carrying out the method.

By means of the vacuum cleaners in question here, dirt and preferably also liquid can be sucked up using at least one suction unit to apply negative pressure to the dirt collecting container, so that a suction flow forms and dirt and liquid can be sucked into the dirt collecting container. The vacuum cleaners have one or more filters, which are disposed in the flow path between the dirt collecting container and the at least one suction unit and serve for separating solid substances from the suction flow. During suction operation, dirt particles are increasingly deposited on the side of the at least one filter that is oriented toward the dirt collecting container, so that after some time the filter or filters have to be cleaned. For cleaning, the side of the filters that is oriented away from the dirt collecting container can be impinged upon by external air, by opening at least one closing valve, so that external air can flow into the at least one suction extraction line via the external air inlet and impinge upon the side of the at least one filter that is orientated away from the dirt collecting container.

In utility model DE 298 23 411 U1, to clean a filter it is proposed to close for a short time a suction hose that is connected to the suction inlet of the dirt collecting container, so that a strong negative pressure forms in the dirt collecting container, and a closing valve is subsequently to be opened for a short time. The filter is then flowed through by the external air in the direction of counterflow, that is to say counter to the direction of the suction flow that prevails during normal suction operation, so that dirt particles adhering to the filter become detached.

In DE 199 49 095 A1, it is proposed to use two filters, which are cleaned in turn, it being possible during the cleaning of one filter for the suction operation to be continued to a restricted extent by way of the other filter.

JP-A-2002028107 discloses a method for cleaning a filter in which the filter can be flowed through by external air counter to the direction of flow prevailing during normal suction operation. Provided for this purpose is an external air inlet, which is adapted to be closed by a valve. When the valve is opened, external air is sucked in on account of the pressure difference between the pressure in the dirt collecting container and the pressure in the outside ambience. This difference in pressure is also present when the suction operation is stopped.

It is an object of the present invention to develop a method of the generic type in such a way that particularly effective cleaning of the at least one filter is made possible.

SUMMARY OF THE INVENTION

This object is achieved according to the invention in the case of a method of the type mentioned at the beginning by providing that, after the at least one suction unit is switched off, at least one closing valve is opened at least once and then closed again and the side of the at least one filter that is oriented away from the dirt collecting container is impinged upon at least once by external air, the magnetic holder being equipped with an electromagnet, to which current is applied to close the closing valve, and the current supply to the electromagnet also being switched off at the same time as the suction unit is switched off.

In the case of the vacuum cleaner according to the invention, the suction air is filtered by means of the filters present, all the filters being used at the same time during normal suction operation. This may involve a single filter or a number of filters that are flowed through simultaneously. During normal suction operation, the at least one closing valve is closed, its valve body lying against the valve seat in a sealing manner and being acted upon by the closing spring with a closing force. The entering of external air into the suction extraction line is consequently prevented. To clean the at least one filter, the closing valve is opened, so that the entering external air can impinge upon the side of the at least one filter that is oriented away from the dirt collecting container. Such cleaning can be repeated during the suction operation in dependence on the degree of soiling of the at least one filter or else time-dependently at periodic intervals. If suction operation is ended, the user switches off the at least one suction unit. Here it is provided that, after the at least one suction unit is switched off, the closing valve is opened and closed again at least one further time. This has the consequence that the negative pressure still present in the dirt collecting container immediately after the suction unit is switched off is used for the purpose of sucking in external air via the re-opened closing valve, so that the filters present are cleaned once again after the at least one suction unit is switched off. Therefore, when the vacuum cleaner is switched off, filter cleaning is once again carried out in a structurally simple manner. Here, the invention makes use of the realization that, when the suction unit is switched off, there is still negative pressure in the dirt collecting container and in the suction extraction line, so that the at least one closing valve is subject to a pressure difference, since it is exposed on one side to the pressure of the external air and is exposed on the other side to the negative pressure within the suction extraction line. This pressure difference makes it possible in a structurally simple manner for the spring-loaded closing valve to be opened once again and subsequently closed again after the suction unit is switched off, so that the side of the at least one filter that is oriented away from the dirt collecting container is once again impinged upon by external air for a short time after normal suction operation has ended.

According to the invention, the magnetic holder is equipped with an electromagnet, to which current is applied to close the closing valve, and the current supply to the electromagnet is also switched off at the same time as the suction unit is switched off. During normal suction operation, current may be applied to the electromagnet in order to hold the valve body reliably on the valve seat. If the current supply to the electromagnet is interrupted, the magnetic holding force of the electromagnet is no longer present, and the valve body can lift off from the valve seat counter to the closing force of the closing spring on account of the pressure difference prevailing at the closing valve. External air can consequently enter the suction extraction line and can impinge upon the side of the at least one filter that is oriented away from the dirt collecting container to clean said filter. The valve body is subsequently returned again to the valve seat by the closing spring, and renewed application of current to the electromagnet allows the valve body to be held again on the valve seat for the continuation of normal suction operation. If suction operation is ended, the suction unit is switched off, and the current supply to the electromagnet is also interrupted at the same time. This has the consequence, as explained above, that the closing valve once again opens and closes again, the valve body subsequently no longer being held reliably on the valve seat on account of the switched-off electromagnet, but rather it can repeatedly perform a movement back and forth on account of the loading by the closing spring and the running-down suction unit, so that particularly effective filter cleaning can be achieved.

It is of particular advantage if, after the suction unit is switched off, at least one closing valve is repeatedly opened and closed again, since this allows the final cleaning operation to be intensified. The repeated opening and closing of the closing valve after the suction unit is switched off can be achieved in a manner that is structurally simple by the entering external air obtained when the closing valve is first opened after the suction unit is switched off being at least partly extracted again with the aid of the gradually running-down suction unit, so that a certain negative pressure is once again established in the suction extraction line after the closing valve is closed for the first time. The automatic closing of the closing valve is achieved by the valve body being acted upon by the closing spring with a closing force. If the suction unit is switched off after normal suction operation has ended, the closing valve can be opened automatically on account of the pressure difference acting, so that external air can flow into the suction extraction line. Under the effect of the closing spring, the valve body lifting off from the valve seat can be returned again to the valve seat, and the external air that has in the meantime flowed in can be extracted at least partly from the suction extraction channel by the suction unit that is still rotating, so that a negative pressure is once again formed in the suction extraction channel, and consequently there is also a pressure difference at the closing valve, so that the latter opens once again for a short time.

In the case of a preferred embodiment of the procedure according to the invention, the final cleaning operation may be intensified by making a closing force of the closing spring act permanently on the valve body, irrespective of its position, and additionally making a repulsion force of a resilient stop element act upon said valve body in a position at a distance from the valve seat. The resilient stop element that is used in addition to the closing spring ensures that the at least one filter can be effectively cleaned within a very short time, in that it acts with a repulsion force on the valve body lifting off from the valve seat, so that said valve body is returned to the valve seat within a short time. The quick return of the valve body into its closed position has the advantage that, after the suction unit is switched off, the closing valve can be opened and immediately closed again repeatedly within a very short time, so that filter cleaning can be repeatedly carried out for a short time and within the running-down time of the suction unit. A further advantage of the use of a resilient stop element is that cleaning of the at least one filter during normal suction operation can be carried out within a very short time, preferably within a time of less than 0.5 of a second, for example within a time of less than 400 milliseconds, in particular less than 200 milliseconds. This has the consequence that there is no noticeable interruption in suction operation for the user, but rather the suction operation proceeds virtually continuously in spite of periodic filter cleaning. The brief opening of the at least one closing valve allows the at least one filter to be impinged upon by the abruptly entering external air with a pressure surge, which leads to a shaking effect, and consequently mechanical cleaning of the filter. Furthermore, the at least one filter is flowed through by external air in the direction of counterflow for a short time. The suction unit is in flow connection with the filter even during the cleaning of the at least one filter, that is to say during the opening of the closing valve. The external air flowing into the suction extraction line for a short time is consequently sucked away again immediately, so that, after the closing valve is closed, the negative pressure prevailing during normal suction operation is established again in the dirt collecting container already within fractions of a second. Accordingly, during normal suction operation, the at least one filter is flowed through within fractions of a second first by the original suction flow then for a short time by an external air flow and subsequently again by the suction flow. This results in alternating mechanical loading of the at least one filter, whereby the filter cleaning is assisted. The brief opening of the closing valve takes place under the action of the repulsion force of the resilient stop element, which acts with a force upon the valve body only when the latter is disposed at a distance from the valve seat. If the valve body is lying against the valve seat in a sealing manner, the resilient stop element does not exert any force on the valve body. The stop element forms a kind of shock absorber for the valve body, which absorbs the kinetic energy of the valve body and accelerates the valve body back in the direction of the valve seat.

In the case of a preferred refinement of the method according to the invention, the vacuum cleaner is equipped with just a single filter, which is impinged upon by external air for a short time to clean it.

The vacuum cleaner may have a number of external air inlets, which can in each case be closed by means of a closing valve. By simultaneous opening of all the closing valves, a large amount of external air can be fed to the at least one filter within a short time. However, this requires careful coordination of the opening movements of the valve bodies of the closing valves that are used. It is more advantageous if the entire surface area of the at least one filter that is oriented away from the dirt collecting container is impinged upon by external air by opening only a single closing valve.

The at least one closing valve is preferably actuated electronically. As already explained, it is possible for example to use an electromagnet, with the aid of which the movable valve body can be held on the valve seat in a closed position by applying current to the electromagnet. In order to open the closing valve, the current supply to the electromagnet is interrupted. Here it is of advantage if the valve body is equipped with a magnetizable element, which in the closed position of the valve body lies against the end face of the electromagnet and forms a closed magnetic circuit with the electromagnet. The magnetizable element, for example a plate containing iron, concentrates the field lines of the electromagnet in the valve body, so that the latter is reliably held in its closed position under the action of the magnetic force. If, however, the valve body assumes a distance from the valve seat, the magnetic circuit is interrupted, since the magnetizable element also assumes a distance from the electromagnet. This has the consequence that the magnetic force exerted by the electromagnet has only a very short range. In the case of an opening movement, the valve body consequently only experiences a magnetic force in the direct vicinity of the valve seat, while even at a distance of approximately 2 mm between the electromagnet and the magnetizable element the magnetic force is so small that it cannot return the valve body into its closed position. Rather, the closing spring is used to return the valve body.

It is advantageous if the at least one closing valve is actuated in a time-controlled manner. For example, it may be provided that the closing valve is actuated periodically, preferably at time intervals of less than one minute, in particular time intervals of 10 to 30 seconds, the closing valve being opened for less than one second, in particular for less than 0.5 of a second.

The actuation of the at least one closing valve may take place at different time intervals during normal suction operation. For example, the closing valve may initially be kept closed for 10 to 30 seconds, to then be opened for a short time, for example, for approximately one tenth of a second, after a number of shorter time intervals.

As mentioned at the beginning, the invention also relates to a vacuum cleaner for carrying out the aforementioned method. The vacuum cleaner comprises a dirt collecting container, which has a suction inlet and is in flow connection with at least one suction unit via at least one filter and at least one suction extraction line. The vacuum cleaner also comprises at least one external air inlet which opens into the suction extraction line downstream of the at least one filter and is adapted to be closed by means of at least one closing valve, wherein the at least one closing valve has a valve body which is movable back and forth between a closed position, in which it lies against a valve seat, and an open position, in which it is at a distance from the valve seat, wherein it is acted upon by a closing spring with a closing force and, in the closed position, additionally by a magnetic holder with a magnetic holding force.

In order to develop such a vacuum cleaner in such a way that it makes particularly effective cleaning of the at least one filter possible, it is proposed according to the invention that, after the suction unit is switched off, the at least one closing valve is adapted to be automatically opened at least once and then closed again and the side of the at least one filter that is oriented away from the dirt collecting container can be impinged upon at least once by external air, the magnetic holder having an electromagnet to which current can be applied to close the closing valve, and it being possible for the current supply to the electromagnet also to be switched off at the same time as the suction unit is switched off. The vacuum cleaner according to the invention consequently makes a final cleaning of the filters used possible after normal suction operation has ended. For this purpose, the at least one closing valve is adapted to be automatically opened and automatically closed after the suction unit is switched off, so that, with the suction unit already switched off, external air can once again impinge upon the side of the at least one filter that is oriented away from the dirt collecting container and, as a result, can clean said filter. After the suction unit is switched off, the at least one filter consequently experiences a further pressure surge and is once again flowed through in the direction of counterflow.

The magnetic holder of the vacuum cleaner according to the invention has an electromagnet, to which current can be applied to close the closing valve, and the current supply to the electromagnet can also be switched off at the same time as the suction unit is switched off. As already explained, the valve body may be held on the valve seat in a sealing manner during normal suction operation by means of the electromagnet to which current has been applied. For brief filter cleaning, the current supply to the electromagnet may be interrupted, so that the valve body lifts off from the valve seat under the action of the pressure difference prevailing at the closing valve. Under the action of the closing spring and the resilient stop element that is additionally used in the case of a preferred embodiment, the valve body is returned again to the valve seat within a very short time. At the latest at this point in time, current can again be applied to the electromagnet in order to hold the valve body reliably on the valve seat again after a short cleaning operation. If the user ends normal suction operation, said user switches off the at least one suction unit, and the current supply to the electromagnet is interrupted at the same time, so that the valve body is no longer acted upon by a holding force in its closed position. As a result, as already mentioned, a repeated opening and closing movement of the spring-loaded valve body can be achieved in a simple manner after the suction unit is switched off.

It is advantageous if, after the vacuum cleaner is switched off, the closing valve can be automatically opened and then closed again repeatedly. The final cleaning operation can be intensified as a result, as already explained above.

In the case of a particularly preferred configuration of the vacuum cleaner according to the invention, associated with the valve body is a resilient stop element, which acts with a repulsion force upon the valve body in a position at a distance from the valve body. The resilient stop element allows a short opening movement of the valve body to be achieved in a structurally simple manner, wherein initially, starting from its closed position, it is only acted upon by the closing force of the closing spring. Only when the valve body assumes a certain distance from the valve seat does the resilient stop element come into effect, acting upon the valve body with a repulsion force. The resilient stop element absorbs the kinetic energy of the valve body and accelerates it back in the direction of the valve seat. With the aid of the resilient stop element, the closing valve can be closed again within a very short time, in particular after a time of less than one second, preferably less than 0.5 of a second. The normal suction operation of the vacuum cleaner can proceed virtually continuously, and effective filter cleaning nevertheless achieved. External air only enters the dirt collecting container for a very short period of time, so that the suction flow in the region of the suction inlet of the dirt collecting container is not noticeably interrupted. The vacuum cleaner is consequently distinguished by a simple construction, it being possible for all the filters present to be flowed through by suction air at the same time in suction operation and for the entire side of the at least one filter that is oriented away from the dirt collecting container to be impinged upon by external air by the at least one closing valve being opened for a short time. The external air is suddenly fed to the filter, the at least one suction unit being flow-connected to the filter permanently, that is to say also during the time during which it is being cleaned. If the suction unit is switched off after normal suction operation has ended, it still exerts a suction effect for a certain time, for example for a few seconds. Since the closing valve of the vacuum cleaner according to the invention is adapted to be opened and closed again within a very short time, the relatively short running-down time of the switched-off suction unit is sufficient to allow an effective final filter cleaning to be carried out within this time.

The resilient stop element may be configured in various forms. It is preferably formed as a stop spring. In the case of a preferred configuration, it has a greater spring constant than the closing spring. The stop spring is consequently harder than the closing spring, that is to say a higher force is required to compress the stop spring than is the case with the closing spring. In a way similar to the closing spring, the stop spring may have a linear characteristic or a non-linear characteristic. For example, it may be provided that the stop spring and/or the closing spring become harder with increasing spring deflection.

In the case of a preferred configuration of the vacuum cleaner according to the invention, the closing spring and the stop spring are configured as helical springs of different diameters, one of the two helical springs circumferentially surrounding the other helical spring. This makes it possible for the closing spring and the stop spring to be disposed in a space-saving manner and additionally makes simple assembly possible.

Preferably, the closing spring circumferentially surrounds the stop spring. This has the advantage that the valve body is guided into its closed position by a relatively large closing spring. This improves the tilting stability of the valve body.

In the case of a structurally simple configuration, the suction unit and the electromagnet are connected via a common switching element to voltage supply terminals. The switching element may form the main switch of the vacuum cleaner, which can be operated manually by the user. If the main switch is closed, the suction unit is put into operation and current is applied to the electromagnet. Normal suction operation consequently begins. If the main switch is opened, the current supply, both to the suction unit and to the electromagnet, is interrupted. As already explained, the suction unit then still performs a running-down movement and the at least one filter is subjected to a final cleaning operation.

The electromagnet is preferably connected to a control unit for the time-dependent control of the electromagnet. By means of the time-dependent control, periodic filter cleaning can be achieved in a structurally simple manner.

It is of particular advantage if the electromagnet is disposed on a valve holder of the closing valve that forms the valve seat, and if the valve body has a magnetizable element which is associated with the electromagnet and forms a closed magnetic circuit with the electromagnet in the closed position of the valve body. In the closed position of the valve body, the magnetizable element concentrates the field lines of the electromagnet. If, however, the valve body assumes a distance from the valve seat, the magnetic circuit between the electromagnet and the magnetizable element is interrupted. The magnetizable element may be formed for example as a plate and be produced from a material containing iron. In the closed position of the valve body, it may lie against the end face of the electromagnet.

The combined use of an electromagnet, the closing spring and a resilient stop element is of particular advantage, since this allows the valve body to be reliably held in a sealing manner on the valve seat in its closed position. If the closing valve is to be opened, the current supply to the electromagnet is interrupted. With the closing valve closed, the valve body is impinged upon on its side that is oriented toward the external air inlet by the pressure of the external air, that is to say for example by atmospheric pressure, whereas negative pressure is present on its side that is oriented away from the external air inlet. If the current supply to the electromagnet is interrupted, the pressure difference acting on the valve body has the effect that it lifts off from the valve seat counter to the action of the closing spring, so that the closing valve is opened. At a distance from the valve seat, the valve body butts against the resilient stop element, which acts upon the valve body with a repulsion force in the direction of the valve seat. Under the action of the repulsion force and the closing force exerted by the closing spring, the valve body reaches the valve seat again within a very short time. The closing spring has the function here of returning the valve body into the range of the magnetic field of the electromagnet, so that the valve body can be held on the valve seat during normal suction operation by the electromagnet to which current is again applied. If, however, the current supply to the electromagnet is interrupted at the same time as the at least one suction unit is switched off after suction operation is ended, the magnetic holding force is no longer present, and the valve body can perform a repeated movement back and forth for a final filter cleaning operation during the running-down time of the suction unit, the travel of the valve body from its closed position being gradually reduced.

The vacuum cleaner may have a number of filters; it proves to be particularly advantageous if the vacuum cleaner comprises a single filter. In particular, it may be provided that the filter is adapted to be impinged upon by external air over its entire surface area by all the closing valves being opened at the same time. In the case of a structurally particularly simple configuration of the vacuum cleaner according to the invention, it has merely a single closing valve, which is positioned on the side of a filter holder having flow passages that is oriented away from the single filter. The single filter is impinged upon by external air over its entire surface area by opening of the closing valve.

The configuration according to the invention of the vacuum cleaner makes it possible during normal suction operation for the side of the at least one filter that is oriented away from the dirt collecting container to be impinged upon by external air for a short time and for this air to be extracted within a short time by means of the suction unit, which is in flow connection with the filter even when the closing valve is open. It is advantageous if, during the cleaning of the filter, the valve body performs a continuous movement from its closed position via its open position back into its closed position. In the case of such a configuration, when the closing valve is opened, the valve body is first accelerated strongly in the direction away from the valve seat and then strongly decelerated with the aid of the closing spring and preferably with the aid of the resilient stop element, and reversed in its direction of movement, to then be accelerated back in the direction of the valve seat. The entire movement of the valve body from its closed position via the open position back into the closed position can take place within fractions of a second.

In the case of an advantageous embodiment, the at least one filter is adapted to be acted upon by means of the closing valve for less than 400 milliseconds, preferably less than 200 milliseconds, in particular for less than 100 milliseconds. Being acted upon in this way means that there is no noticeable interruption in suction operation for the user, but it results in effective cleaning of the filter during normal suction operation.

The at least one filter is preferably adapted to be impinged upon by external air by means of the at least one closing valve during normal suction operation while maintaining a negative pressure in the region of the opening of a suction tube opening into the suction inlet. If the at least one closing valve is opened, the pressure on the side of the filter that is oriented away from the dirt collecting container abruptly increases and is then reduced again. The impact-like pressure increase brings about effective cleaning of the filter, since the pressure increase is however reduced again right away by the at least one suction unit and does not lead to a complete interruption in the negative pressure in the region of the opening of the suction hose opening into the suction inlet. Rather, virtually continuous suction operation can be maintained.

The following description of a preferred embodiment of the invention serves for further explanation in conjunction with the drawings.

DETAILED DESCRIPTION OF THE INVENTION

Figure 1:
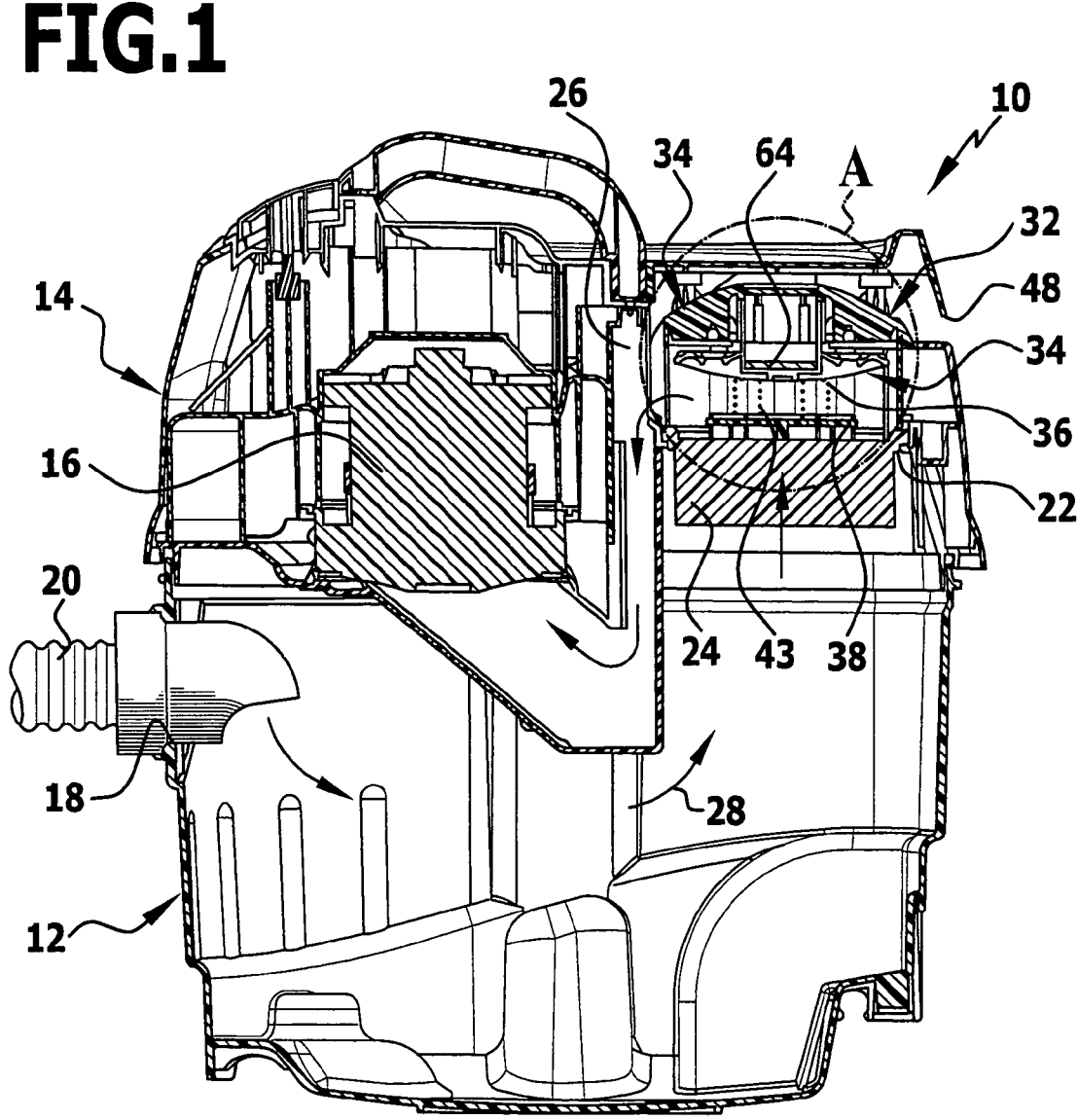
FIG. 1 shows a schematic sectional view of a vacuum cleaner according to the invention.

Schematically represented in the drawing is a vacuum cleaner 10, with a lower part, which forms a dirt collecting container 12, and with an upper part 14, which is mounted on the lower part and accommodates a suction unit 16. The dirt collecting container 12 comprises a suction inlet 18, to which a suction hose 20 can be connected. At the free end of the suction hose 20 (not represented in the drawing to achieve a better overview), a suction nozzle may be connected. Alternatively, it may be provided that the suction hose 20 is connected to a working tool, for example a drilling unit or a milling unit, so that dust produced during the operation of the working tool can be sucked away.

The upper part 14 forms a suction outlet 22 for the dirt collecting container 12. Held on the suction outlet 22 is a folded filter 24, which is followed by a suction extraction line in the form of a suction channel 26. By way of the suction channel 26, the folded filter 24 is permanently flow-connected to the suction unit 16. The dirt collecting container 12 can be acted upon permanently by negative pressure from the suction unit 16 via the suction channel 26 and the folded filter 24, so that there forms a suction flow, symbolized in FIG. 1 by the arrows 28, under the action of which dirt can be sucked into the dirt collecting container 12. By means of the folded filter 24, the dirt particles can be separated from the suction flow 28.

Figure 2:
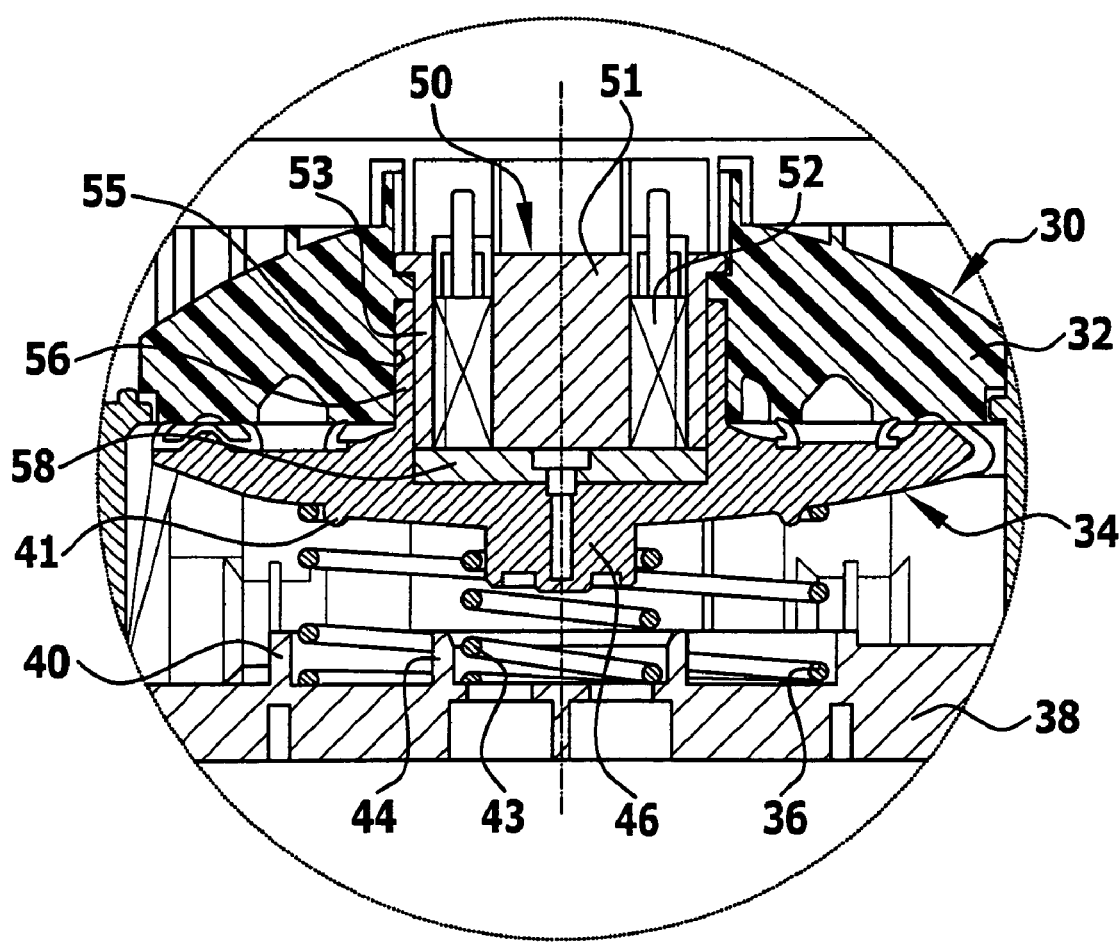
FIG. 2 shows an enlarged representation of detail A from FIG. 1.

Disposed above the folded filter 24 in the upper part 14 is a closing valve 30, which is shown enlarged in FIG. 2. It comprises a valve holder 32, which is fixedly disposed in the upper part 14, forms a valve seat and interacts with a valve body in the form of a circular valve disk 34. The valve disk 34 is acted upon by a closing force in the direction of the valve holder 32 by means of a closing spring 36. The closing spring 36 has a linear characteristic and is restrained between a plate-like filter holder 38, having a multiplicity of flow passages and fixedly disposed in the upper part 14, and the valve disk 34. The filter holder 38 has on its upper side that is oriented toward the closing valve 30 an outer annular collar 40, which circumferentially surrounds the neighboring end region of the closing spring 36 formed as a helical spring. The valve disk 34 has on its underside that is oriented toward the filter holder 38 an annular bead 41, against the outside of which the closing spring 36 lies.

In addition to the closing spring 36, the filter holder 38 carries a resilient stop element in the form of a stop spring 43, which in a way similar to the closing spring 36 is formed as a helical spring and has a linear characteristic. For holding the stop spring 43, the filter holder 38 has on its upper side that is oriented toward the closing valve 30 an inner annular collar 44, which is disposed concentrically in relation to the outer collar 40 and is entered by an end portion of the stop spring 43. Formed on the underside of the valve disk 34, aligned with the inner annular collar 44, is a guiding pin 46, which in the closed position of the valve disk 34 that is represented in FIG. 2 is surrounded by an end region of the stop spring 43. By contrast with the closing spring, the stop spring 43 is not biased in the closed position of the valve disk. Only when the valve disk 34 lifts off from the valve seat of the valve holder 32 does the stop spring 43 come up against the underside of the valve disk 34 and become a little compressed when there is further movement of the valve disk 34.

The valve holder 32 has a multiplicity of through-openings (not represented in the drawing), which open into the valve seat against which the valve disk 34 lies in a sealing manner when it assumes its closed position. Level with the valve holder 32, the upper part 14 has a lateral opening 48. External air can flow into the through-openings of the valve holder 32 via the lateral opening 48. If the valve disk 34 assumes a position at a distance from the valve holder 32, and consequently also from the valve seat, the lateral opening 48 is in flow connection with the suction channel 26 via the through-openings of the valve holder 32 and external air can impinge upon the side of the filter 24 that is oriented away from the dirt collecting container 12. If the valve disk 34 assumes its closed position, the flow connection between the suction channel 26 and the lateral opening 48 is interrupted.

In a central region, the valve holder 32 carries a magnetic holder in the form of an electromagnet 50 with a magnetic core 51, which is surrounded by a magnetic coil 52. The outer termination of the electromagnet 50 is formed by a cylindrical shell 53, which in the same way as the magnetic core 51 is produced from a magnetizable material. The shell 53 is circumferentially surrounded by a guiding receptacle in the form of an annular space 55, which is entered by a guiding sleeve 56 formed on the upper side of the valve disk 34. The annular space 55 and the guiding sleeve 56 form guiding elements for the displaceable mounting of the valve disk 34. The guiding sleeve 56 receives a magnetizable element in the form of an iron plate 58, which in the closed position of the valve disk 34 lies against the free end face of the electromagnet 50 and in combination with the magnetic core 51 and the sleeve 53 forms a closed magnetic circuit. The closed magnetic circuit concentrates the magnetic field lines of the electromagnet 50.

Figure 3:
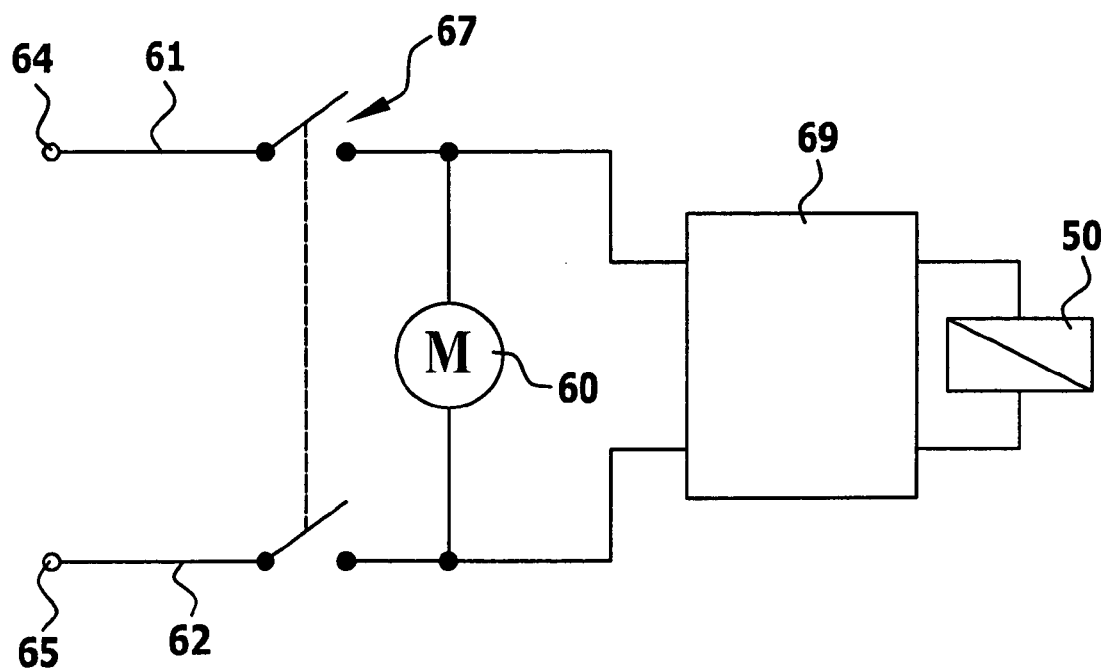
FIG. 3 shows a block diagram of a supply circuit for an electromagnet and a suction unit of the vacuum cleaner.

The current supply to the electromagnet 50 and the suction unit 16 is diagrammatically represented in FIG. 3. The suction unit 16 has an electric motor 60, which is connected via a first supply line 61 and a second supply line 62 to voltage supply terminals 64 and 65, respectively. The voltage supply terminals 64 and 65 may be configured, for example, as mains power terminals, to which a mains power cable of the vacuum cleaner 10 can be connected.

An electrical switching element in the form of a main switch 67 of the vacuum cleaner 10 is connected into the supply lines 61 and 62. The main switch 67 can be actuated manually by the user. If the main switch 67 is closed, the electric motor 60 of the suction unit 16 is connected to the voltage supply terminals 64, 65 and can be supplied with the supply voltage. If the main switch 67 is open, the connection between the electric motor 60 and the voltage supply terminals 64, 65 is interrupted.

Connected parallel to the electric motor 60 is a control unit 69, which supplies the electromagnet 50 with current if the main switch 67 is closed. If the main switch 67 is open, the current supply to the electromagnet 50 is interrupted.

If the user switches the vacuum cleaner 10 on, by closing the main switch 67, the supply voltage is applied to the electric motor 60 and the suction unit 16 is put into operation. At the same time, the electromagnet 50 is supplied with current via the control unit 69 and the valve disk 34 is acted on by a magnetic holding force from the electromagnet 50, which reliably keeps it in its closed position. The suction unit 16 acts upon the dirt collecting container 12 and the suction channel 26 with a negative pressure, so that dirt particles and similarly liquid droplets can be sucked into the dirt collecting container 12. Dirt particles are deposited on the filter 24, so that it gradually becomes clogged during normal suction operation. At time intervals of 10 to 30 seconds, for example, in particular time intervals of approximately 15 seconds, the current supply to the electromagnet 50 is therefore interrupted for a short time by means of the control unit 69, for a time period of approximately 0.1 of a second. This has the consequence that the magnetic field of the electromagnet 50 breaks down, and consequently the magnetic holding force for the valve disk 34 is no longer present. This in turn has the effect that the valve disk 34 lifts off from the valve seat counter to the action of the closing spring 36, on account of the pressure difference acting on it, which is produced by the outside pressure of the external air present in the region of the valve holder 32 and the inside pressure within the suction channel 26. External air can then suddenly flow into the suction channel 26 through the through-opening of the valve holder. The filter 24 is consequently impinged upon by external air in an impact-like manner on its side that is oriented away from the dirt collecting container 12. This leads to the filter 24 undergoing a mechanical shaking effect. Furthermore, the filter is flowed through by the external air in the direction of counterflow. This has the overall consequence of effective cleaning of the filter 24.

After a short lifting movement, the valve disk 34 lifting off from the valve seat comes with its underside up against the stop spring 43, which acts upon the valve disk 34 with a repulsion force in the direction of the valve holder 32. The stop spring 43 absorbs the kinetic energy of the valve disk 34. The latter is accelerated by the stop spring 43 in the direction of the valve seat. When the valve disk 34 approaches the valve seat, the stop spring 43 releases the valve disk 34. The latter is returned to the valve seat by the closing spring 36, so that the iron plate 58 comes to lie against the end face of the electromagnet 50 again. At the latest at this point in time, current is once again applied to the electromagnet 50 by the control unit 69, so that the valve disk 34 is again held in a sealing manner against the valve seat by the electromagnet 50. The interruption of the current supply for the electromagnet 50 takes-place only over a time period of at most 100 milliseconds, so that the closing valve 30 opens only for a very short time and external air can get to the filter 24 only for a very short time. Subsequently, current is again applied to the electromagnet 50, to be precise for a time period of approximately 10 to about 30 seconds, in particular for a time period of approximately 15 seconds. Consequently, during suction operation of the vacuum cleaner 10, brief filter cleaning takes place every 15 seconds. On account of the short opening of the closing valve 30, a negative pressure is maintained in the region of the opening of the suction hose 20 flowing into the suction inlet 18 even during the filter cleaning. This has the consequence that virtually continuous suction operation is possible for the user and reliable filter cleaning is nevertheless ensured.

If the user ends suction operation, he opens the main switch 67. This has the consequence that the electric motor 60 of the suction unit 16 is disconnected from the voltage supply terminals 64, 65 at the same time as the electromagnet 50. With the switching off of the suction unit 16, the magnetic field of the electromagnet 50 therefore also breaks down. Consequently, the magnetic holding force acting on the valve disk 34 no longer occurs. At this point in time, the dirt collecting container 12 and the suction channel 26 are still under negative pressure, so that the valve disk 34 is subjected to a pressure difference and lifts off from the associated valve seat counter to the action of the closing spring 36. In a way corresponding to the cleaning operation explained above, the valve disk subsequently butts against the stop spring 43, which acts upon the valve disk 34 with a repulsion force in the direction of the valve seat, so that the valve disk 34 comes to lie against the valve holder 32 again after a very short opening movement. During the opening movement, external air flows against the side of the filter 24 that is oriented away from the dirt collecting container 12 and leads to further filter cleaning. The suction unit 16 is set in rotation by the electric motor 60 during normal suction operation. After the electric motor 60 is switched off, the suction unit 16 gradually runs down. This has the consequence that at least part of the external air flowing in during the brief opening movement of the valve disk 34 is sucked away, so that, after renewed closing of the closing valve 30, a negative pressure once again forms in the suction channel 26 and also in the dirt collecting container 12. This has the effect that the valve disk 34 lifts off once again from the valve seat, and consequently external air can once again reach the side of the filter 24 that is oriented away from the dirt collecting container 12. Consequently, in combination with the switching off of the electromagnet 50 and the spring-loaded valve disk 34, the running-down suction unit 16 results in the filter 24 being subjected to a final cleaning operation when the suction unit 16 is switched off, the valve disk 34 repeatedly performing a movement back and forth and it being possible for the filter 24 to undergo a number of pressure surges. Consequently, not only is the filter 24 subjected to cleaning at time intervals during normal suction operation, but a final filter cleaning additionally takes place after the suction unit 16 is switched off. When the vacuum cleaner 10 is put into operation again, it consequently has a cleaned filter 24.

The invention claimed is:

1. Method for cleaning the filters of a vacuum cleaner, the vacuum cleaner comprising a dirt collecting container, which dirt collecting container has a suction inlet and is in flow connection with at least one suction unit via at least one filter and at least one suction extraction line, and at least one external air inlet which opens into the suction extraction line downstream of the at least one filter and which is adapted to be closed by means of at least one closing valve, wherein the at least one closing valve has a valve body which is movable back and forth between a closed position, in which the valve body lies against a valve seat, and an open position, in which the valve body is at a distance from the valve seat, wherein the valve body is acted upon by a closing spring with a closing force and, in the closed position, the valve body is additionally acted upon by a magnetic holder with a magnetic holding force, the method comprising:

while the suction unit is switched on and during a suction operation of the vacuum cleaner, opening the at least one closing valve such that a side of the at least one filter that is oriented away from the dirt collecting container is impinged upon by external air, and subsequently closing the at least one closing valve again, after the at least one suction unit is switched off, opening and closing the at least one closing valve again at least once such that the side of the at least one filter that is oriented away from the dirt collecting container is impinged upon at least once more by the external air, wherein:

the magnetic holder is equipped with an electromagnet, to which current is applied to close the at least one closing valve, and the current supply to the electromagnet is switched off at the same time that the suction unit is switched off.

2. Method according to claim 1, wherein after the suction unit is switched off, the at least one closing valve is repeatedly opened and closed again.

3. Method according to claim 1, wherein:

a closing force of the closing spring is made to act permanently on the valve body, irrespective of its position, and a repulsion force of a resilient stop element is additionally made to act upon the valve body in a position at a distance from the valve seat.

4. Method according to claim 1, wherein the vacuum cleaner is equipped with a single filter.

5. Method according to claim 1, wherein an entire surface area of the side of at least one filter that is oriented away from the dirt collecting container is impinged upon by external air by opening a single closing valve.

6. Method according to claim 1, wherein the at least one closing valve is actuated electronically.

7. Method according to claim 1, wherein the at least one closing valve is actuated in a time-controlled manner.

8. Method according to claim 7, wherein the at least one closing valve is actuated periodically at time intervals of less than 30 seconds.

9. Vacuum cleaner, comprising:

at least one suction unit,
at least one filter,
at least one suction extraction line,
a dirt collecting container, which has a suction inlet and is in flow connection with the at least one suction unit via the at least one filter and the at least one suction extraction line,
at least one external air inlet which opens into the suction extraction line downstream of the at least one filter,
at least one closing valve adapted to close the at least one external air inlet, the at least one closing valve having a valve body which is movable back and forth between a closed position, in which the valve body lies against a valve seat, and an open position, in which the valve body is at a distance from the valve seat, the valve body being acted upon by a closing spring with a closing force and, in the closed position, the valve body being additionally acted upon by a magnetic holder with a magnetic holding force, wherein:

while the suction unit is switched on and during a suction operation of the vacuum cleaner, the at least one closing valve is opened such that a side of the at least one filter that is oriented away from the dirt collecting container is impinged upon by external air, and subsequently the at least one closing valve is closed again, after the suction unit is switched off, the at least one closing valve is automatically opened at least once and then closed again such that the side of the at least one filter that is oriented away from the dirt collecting container can be impinged upon at least once more by the external air, the magnetic holder has an electromagnet, to which current can be applied to close the at least one closing valve, and the current supply to the electromagnet is adapted to be switched off at the same time that the suction unit is switched off.

10. Vacuum cleaner according to claim 9, wherein after the suction unit is switched off, the at least one closing valve can be automatically opened and closed again repeatedly.

11. Vacuum cleaner according to claim 9, wherein associated with the valve body is a resilient stop element, which acts with a repulsion force upon the valve body in a position at a distance from the valve seat.

12. Vacuum cleaner according to claim 11, wherein the resilient stop element is configured as a stop spring.

13. Vacuum cleaner according to claim 12, wherein a spring constant of the stop spring is greater than a spring constant of the closing spring.

14. Vacuum cleaner according to claim 12, wherein the closing spring and the stop spring are configured as helical springs of different diameters, one of the two helical springs circumferentially surrounding the other helical spring.

15. Vacuum cleaner according to claim 9, wherein the suction unit and the electromagnet are connected via a common switching element to voltage supply terminals.

16. Vacuum cleaner according to claim 9, wherein the electromagnet is connected to a control unit for the time-dependent control of the electromagnet.

17. Vacuum cleaner according to claim 9, wherein:

the electromagnet is disposed on a valve holder that forms the valve seat, and the valve body has a magnetizable element which is associated with the electromagnet and forms a closed magnetic circuit with the electromagnet in the closed position of the valve body.

18. Vacuum cleaner according to claim 9, wherein the vacuum cleaner has a single filter.

19. Vacuum cleaner according to claim 18, wherein the side of the filter is adapted to be impinged upon by external air over an entire surface area by opening of the at least one closing valve.

20. Vacuum cleaner according to claim 9, wherein the valve body is movable continuously from the closed position via the open position back into the closed position.

21. Vacuum cleaner according to claim 9, wherein the at least one filter is adapted to be impinged upon by external air by means of the at least one closing valve for less than 400 milliseconds.

22. Vacuum cleaner according to claim 9, wherein the at least one filter is adapted to be impinged upon by external air by means of the at least one closing valve while maintaining a negative pressure in a region of an opening of a suction hose opening into the suction inlet.

* * * * *